June 11, 1929. H. I. MORRIS 1,716,652
TIRE MAKING MACHINE
Filed Nov. 15, 1924 3 Sheets-Sheet 1

June 11, 1929.   H. I. MORRIS   1,716,652
TIRE MAKING MACHINE
Filed Nov. 15, 1924   3 Sheets-Sheet 2

INVENTOR
Howard I. Morris
BY
Geo. A. Pitts
ATTORNEY

Patented June 11, 1929.

1,716,652

UNITED STATES PATENT OFFICE.

HOWARD I. MORRIS, OF LAKEWOOD, OHIO, ASSIGNOR TO THE CORD TIRE MACHINE COMPANY, OF CLEVELAND, OHIO, A CORPORATION OF ARIZONA.

TIRE-MAKING MACHINE.

Application filed November 15, 1924. Serial No. 750,127.

This invention relates to a machine for making tire carcasses, more particularly to that type of machine disclosed in my co-pending application Serial No. 705,654, of which this application is a continuation in part, wherein a web of material is wound convolutely on a core to form a carcass.

One object of the invention is to provide an improved mechanism for feeding a continuous web of material to a rotating member and laying the web thereon.

Another object of the invention is to provide improved means for laying a web of material on the forming member without causing wrinkling of the material between its side edges.

Another object of the invention is to construct an apparatus of this character in which the guide for the forming material and the side edge rolling down devices are co-operatively associated to effect the application of the material to the forming member without wrinkles and under proper tension.

Another object of the invention is to provide an improved mechanism for rolling or positioning the side edges of the carcass forming web against the sides of the core.

Another object of the invention is to provide an improved carcass forming mechanism in which the bead portions of the material are positioned in a substantially side by side relation as the winding of the carcass proceeds.

A further object of the invention is to construct a bead rolling or positioning mechanism that is relatively simple and easily operated.

Another object of the invention is to support the bead rolling or positioning devices for engagement with the bead portions of the web at a predetermined position relative to the point of contact of these portions with the bead rings.

Another object of the invention is to so mount the bead rolling and positioning devices that they will be adapted for use in connection with forming members of different diameters to engage the bead portions of the material at a predetermined distance beyond their engagement with the forming member, irrespective of the size thereof.

Other objects of the invention will be apparent to those skilled in the art to which my invention relates from the following description taken in connection with the accompanying drawings, wherein.

I have, for illustrative purposes, shown my invention as applied to a machine for making tire carcasses wherein the material of which the carcass is made, is continuously fabricated into a web and the latter is convolutely wound on a forming member to produce the carcass with the desired number of plies of material. This machine, a portion of which is shown in Fig. 1 of the accompanying drawings, forms the subject matter of my aforesaid co-pending application.

Figures 1, 10:
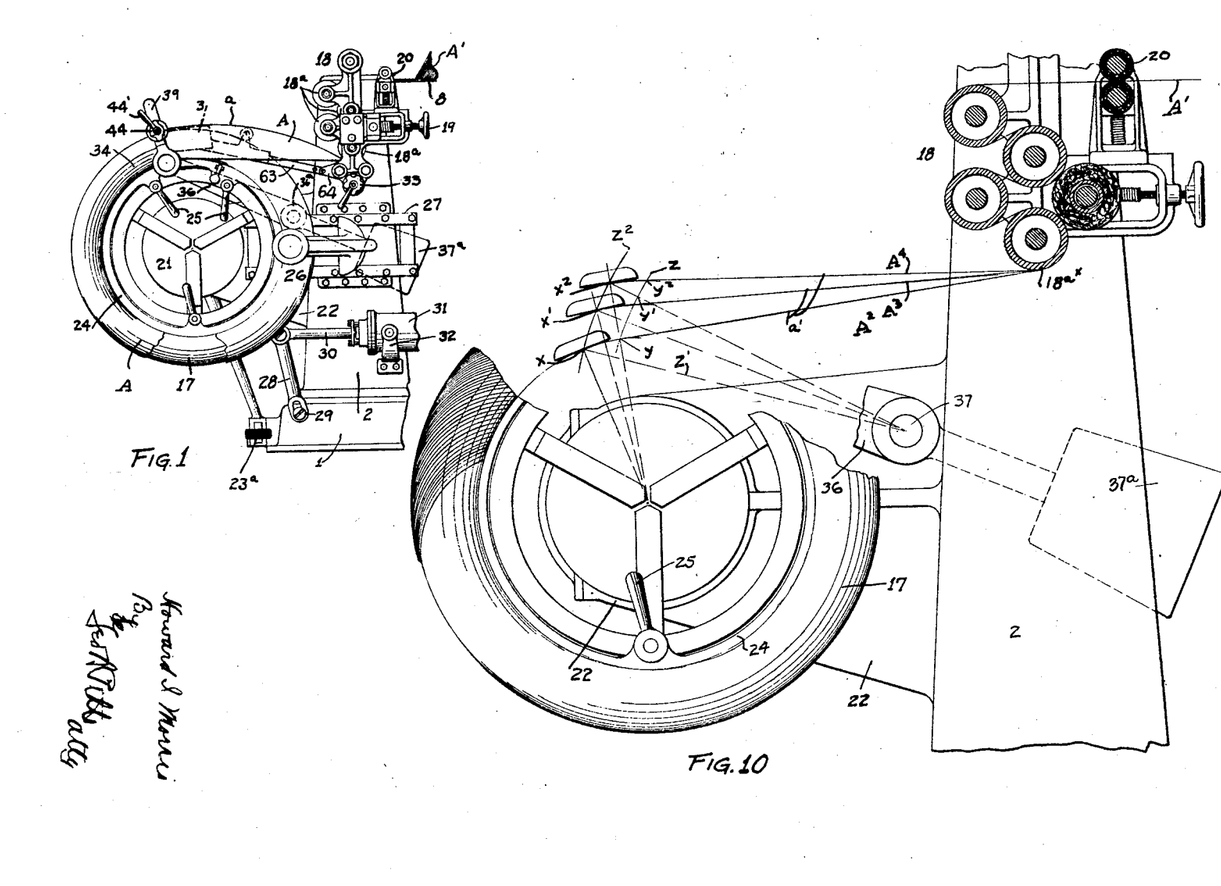
Fig. 1 is a fragmentary view of a machine for making tire carcasses embodying my invention.
Fig. 10 is a fragmentary view, showing diagrammatically the supply of the web to forming members or cores of different sizes and the different positions of the bead rollers when in operative relation therewith.

Referring to Fig. 1, 1 indicates a base of any desired construction for supporting the operating parts of the mechanism. As fully disclosed in the aforesaid application, the mechanisms of the complete machine operate first to supply and fabricate the various materials into a web of the composite type, indicated at A, having a body portion $a$ and beads $a'$ (see Fig. 7) extending along its opposite sides or edges and then to wind such composite web onto a rotatable member or core a predetermined number of times to form an annular multi-ply member, such as a tire carcass.

As the present invention relates to the mechanism for applying the web upon or to the rotating core and rolling down and positioning the bead portions thereof, only that portion of the machine relating to the supply of the composite web and winding of the carcass is shown. 2 indicates a standard rising from the base 1, at one end thereof, and supporting at one side a mechanism, indicated as an entirety at 18, for consolidating the materials, shown at A', and for feeding the resulting composite web A to a guide shoe, indicated as an entirety at 3. The mechanism 18 preferably comprises a plurality of rolls 18ª, certain of which are driven, rotatably mounted at their inner ends in suitable bearings provided on the standard 2, the outer ends of the rolls being rotatably mounted in bearings in a plate 18ᵇ supported in spaced relation to the standard 2, and a pair of rolls 20 interposed between the rolls 18ª and the free end of the platen 8, see Fig. 1.

19 indicates devices for adjusting one of the rolls 18ª to increase the pressure thereof on the materials, to complete the consolidation thereof.

The core 17 is removably mounted upon a chuck 21, which in turn is supported upon and driven by a shaft rotatably mounted in bearings in a housing 22, which extends outwardly from the rear side of the standard 2. The shaft for the chuck is driven through suitable driving connections by a motor (not shown), the latter being mounted on the base 1. The chuck shaft is connected to and disconnected from the driven element of the driving connections in any desired manner, preferably by a suitable clutch, and such connection and disconnection may be controlled by a foot pedal 23ª or other device. The core 17 is preferably driven at a faster rate of speed than the supply of the web from the roll 18ª, so that the side edges of the web will be wound on the core under tension, the clutch being of the friction type to permit of any required slippage.

Figures 3, 7, 8, 9:
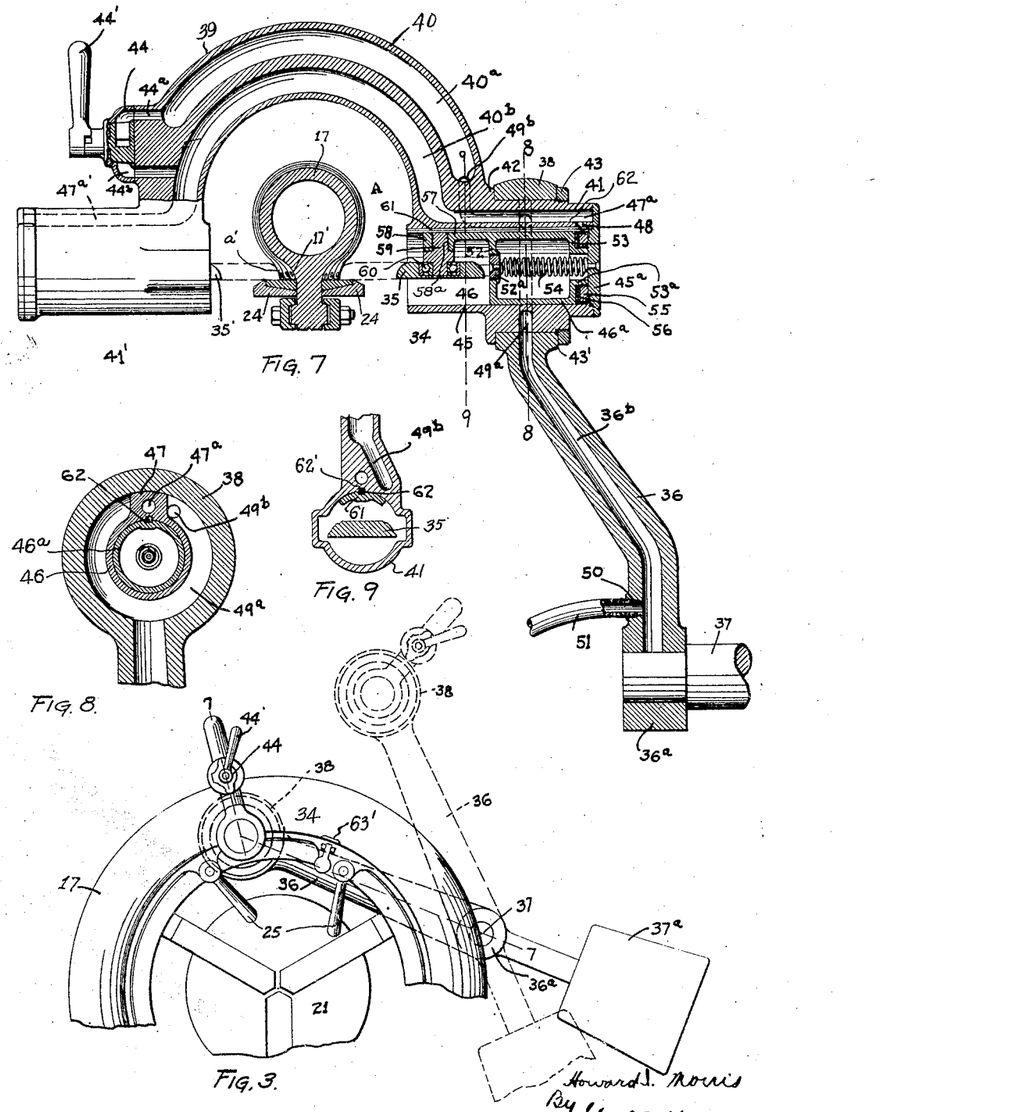
Fig. 3 is a fragmentary side elevation of the chuck, forming member and bead rolling or positioning mechanism (the guide for the material being omitted).
Fig. 7 is a view of the bead rolling or positioning mechanism, partly in section on the line 7—7 of Fig. 3.
Fig. 8 is a section on the line 8—8 of Fig. 7.
Fig. 9 is a section on the line 9—9 of Fig. 7.
Figure 4:
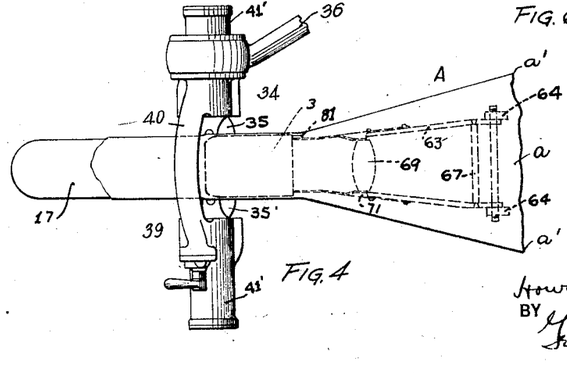
Fig. 4 is a top plan view of a portion of the apparatus shown in Fig. 2.
Figure 5:
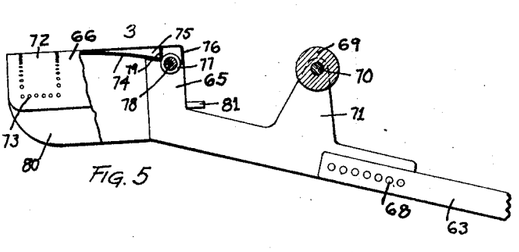
Fig. 5 is a side elevation of the guide device.
Figure 6:
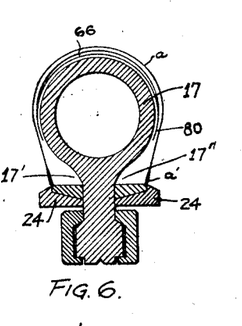
Fig. 6 is a section on the line 6—6 of Fig. 2.

24 indicates a pair of bead rings arranged to be removably clamped by devices 25 to the opposite sides of the core 17. As shown in Figs. 6 and 7 the bead rings 24 are associated with the inner portions of the core 17 to form bead receiving pockets 17' and an engaging wall for the bead edges so that the latter may be aligned in a plane that is approximately at right angles to the plane of the core.

26 indicates as an entirety a mechanism for rolling down the body portion $a$ of the web A as it winds on the core 17. The rolling down mechanism 26 is slidably mounted in guides 27 carried by the standard 2 so as to move toward and from the core 17, preferably in a radial direction. The rolling down mechanism 26 is connected to the free end of a lever 28, which is slidably and pivotally connected at its lower end to the base 1, as shown at 29. Intermediate its ends, the lever 28 is connected to a rod 30 which carries at its inner end a piston mounted in a cylinder 31. The cylinder 31 is provided with valved controlled ports for the admission and exhaust of compressed air or other medium, whereby the rod 30 may be operated to swing the lever 28 and thus move the rolling down mechanism 26 into and out of operating position. The cylinder 31 is preferably trunnioned between the standard 2 and a bracket 32, so that it may accommodate itself to the position of the lever 28 as the latter is operated.

33 indicates a valve mechanism for controlling the compressed air to the body rolling down mechanism 26 and the piston within the cylinder 31 therefor.

The body rolling down mechanism 26 forms the subject-matter of a separate copending application Serial No. 736,349 for which reason further description thereof will not be necessary.

34 indicates as an entirety the bead rolling or positioning mechanism having a pair of rollers 35, 35', mounted to move toward and from the core 17, preferably in a direction at right angles thereto, to press the bead portions $a'$ of the web A into the pockets 17' against the opposite sides of the core with their longitudinal edges adjacent the faces of the bead rings 24.

36 indicates an arm having a hub 36ª at its inner end. The hub 36ª is fixed, in any desired manner, to a shaft 37 mounted in suitable bearings provided in the walls of the housing 22. The shaft 37 preferably extends through the housing 22 and projects at its opposite side so as to carry a counterweight 37ª, which tends to swing the arm 36 to the position shown in dotted lines in Fig. 3. The purpose of the arm 36 is to movably support the rollers 35, 35', and their operating means to be later described, whereby they may be readily moved from an inoperative position (see dotted lines in Fig. 3) to an operative position (see dotted lines in Fig. 7), and one object of the invention (as already set forth) is to so position the supporting shaft 37 for the arm 36 that the rollers 35, 35', will, in all sizes or diameters of cores to be used, engage the bead portions $a'$ of the web at a predetermined point or distance from the points of contact of the latter with the bead rings 24 for the core, or the points of delivery of these bead portions into operative relationship to the sides of the core. The manner in which this position of the shaft 37 is found will be later set forth. The outer end of the arm 36 is enlarged to form a collar 38, the purpose of which will later be described. 36$^b$ indicates a conduit formed in the arm and extending from the inner wall of the hub 36$^a$ to the inner wall of the collar 38, so as to supply fluid under pressure, such as air, for a purpose to be later described. While the extension of the conduit through these walls is made to facilitate the casting of the arm 36, such extension through the wall of the collar 38 is required to provide a connection as will later appear. 39 indicates a frame preferably comprising a substantially U-shape section 40 and hollow members 41, 41', carried at the opposite ends of the U-section and preferably formed integrally therewith. As shown in Fig. 7, one of the hollow members (41) removably fits into and through the collar 38 so that the frame 39 may be supported by the arm 36. The hollow member 41 is preferably rotatably mounted in the collar 38 so that the rollers 35, 35', may be adjusted into tangential relation to the bead rings 24, or at any angle to such tangency, when in operative position, to prevent tendency of the roller from running under the bead portion, as well as to exert a smoothing or pulling down action thereon and adjacent portions of the material. The hollow member 41 is provided with a shoulder 42 which seats against the inner face of the collar 38, being clamped thereagainst to prevent its endwise as well as rotative movement by a nut 43 engaging screw threads on the outer surface of the member 41. A gasket 43' may be interposed between the nut 43 and collar 38, if desired, to prevent escape of the air. The arm 36 is preferably off-set intermediate its ends so as to support the frame 39 for movement in the plane of the core 17 to position the hollow members 41, 41', at opposite sides of the core 17 when the arm 36 is moved to the position shown in Figs. 1, 2, 3 and 4.

The U-section 40 is preferably constructed in a manner to form two fluid conduits designated 40$^a$, 40$^b$, the former being connected with the conduit 36$^b$ and the latter being arranged to supply the fluid in the manner presently to be described.

As shown in Fig. 7, the conduit 40$^a$ extends around the section 40 to the remote end thereof, that is, that end on the outer side of the core 17. 44 indicates a valve device mounted on the outer side or end of the frame 39 and common to two ducts 44$^a$, 44$^b$, leading to the conduits 40$^a$, 40$^b$, respectively. The movable element of the valve device 44 is provided with a handle 44' whereby such element may be positioned to admit air from the conduit 40$^a$ to the conduit 40$^b$, for a purpose later to appear, or to cut off such flow. By extending the conduit 40$^a$ to the remote end or side of the section 40, the valve device will be arranged within easy reach of the operative operating the machine. The hollow member 41 comprises a cylindrical wall 45 closed at its outer end by a cap 45$^a$ to form a cylinder 46 for a piston 46$^a$. At one side (preferably along its upper side), the wall 45 is thickened, as shown at 47, to provide for a duct 47$^a$ for the fluid, the duct extending through the thickened wall and being connected at its outer end with a port 48 to convey the fluid to the rear end of the cylinder 46 or behind the piston 46$^a$. At its inner end the duct 47$^a$ is connected to the conduit 40$^b$. 49 indicates a connection for the fluid leading from the conduit 36$^b$ to the conduit 40$^a$. This connection is provided by (1) forming a substantially annular groove 49$^a$ in that portion of the wall 45 which fits within the collar 38 (the wall being thickened to provide for such groove) and (2) forming in the adjacent wall or walls a duct 49$^b$ leading from the groove 49$^a$ to the conduit 40$^a$. By extending the groove 49$^a$ around the wall 45, a connection is made with the conduit 36$^b$ in all positions of rotative adjustment of the frame 39 in the arm 36. At some point in the arm 36 (but preferably relatively close to its supporting shaft 37) an opening 50 is formed through one of its side walls into the conduit 36$^b$, so that a pipe 51, preferably of flexible character may be connected in the opening and supply the fluid for operating the pistons 46$^a$. Each piston 46$^a$ preferably comprises a hollow member having inner and outer end walls 52, 53, respectively, formed with axial openings, the opening in the wall 52 receiving a plug 52$^a$ to which one end of a spring 54 is connected and the opening in the wall 53 permitting the spring to extend through the wall so that its outer end may be connected to the cap 45$^a$. When the piston is moved inwardly, that is, toward the core 17, upon the admission of compressed air through the port 48, the spring 54 is put under tension so that it may return the piston to its outer position when the supply of air pressure is cut off. The end wall 53 may be provided with a collar 53$^a$ having screw threads to receive a ring 55 adapted to engage a packing 56. At one side (but preferably at its upper portion), the wall of the piston is extended inwardly as indicated at 57, beyond the inner wall 52 and such extension 57 is provided with a boss 58 formed with a screw-threaded opening 58$^a$ extending radially of the cylindrical wall 45 to receive the screw-threaded shank of a stud shaft 59 on which the adjacent roller 35 is mounted, the shaft 59 being of such length that the axis of the piston 46$^a$ extends diametrically through the roller 35. The shaft 59 and roller 35 are shaped to provide for an anti-friction bearing 60 between them. Along one side the piston 46ᵃ and the inner wall of the cylinder 46, are formed with longitudinally extending grooves 61, 62′, to receive a key 62, the purpose of which is to prevent rotative movement of the piston so that the roller 35 will be maintained in a fixed relation relative to the frame 39 and arm 36, since it must occupy a predetermined tangential or other relation, according to the adjustment of the frame 39, to the adjacent bead ring 24 when the arm 36 is moved to the position shown in Figs. 1, 2 and 3.

The hollow member 41′ is similar in construction to the member 41, except that it is not necessary to thicken its wall to provide for a groove and a conduit corresponding to the groove 49ᵃ and conduit 49ᵇ. It contains a cylinder 46 and a piston similar in construction to the piston 46ᵃ, operated in a direction to press the adjacent roller 35′ against the core 17 by compressed air supplied through the duct 47ᵃ′ and in the opposite direction by a coiled spring (not shown).

From the foregoing description it will be seen that the rollers 35, 35′, are simultaneously operated into engagement with or toward the opposite sides of the core and to roll down the bead portions a′ of the web A in the bead pockets 17′.

In operating the rolling down rollers 35, 35′, the free end of the web A is laid over the core and the bead portions clamped against the core by clamps 63′ (only one being shown in the drawings); then the arm 36 is swung to the position shown in Fig. 3; then the valve handle 44′ is operated to admit air to the cylinders 46, 46′, which forces the pistons inwardly and projects the rollers against the bead portions a′; next, the clutch for the chuck shaft is thrown in and the chuck set in operation, with the result that the web is fed over the guide 3 and winding thereof takes place as the core 17 rotates; the winding being continued until the desired number of convolutions are applied to the core.

As the winding proceeds, the bead portions a′ are pressed into the bead pockets 17′ in side by side relation with their free edges in engagement with the bead rings 24, as shown in Fig. 7. By using a fluid, such as compressed air, for pressing the rollers 35, 35′, against the bead portions a′, they are held in yielding engagement therewith and readily accommodate themselves to the increasing thickness as the winding proceeds.

In practice I have found it desirable to position the rollers for engagement with the bead portions a′ (indicated at x in Fig 10) at approximately two inches beyond their point of contact (indicated at y) with the bead rings as they feed from the consolidating mechanism 18.

Figure 2:
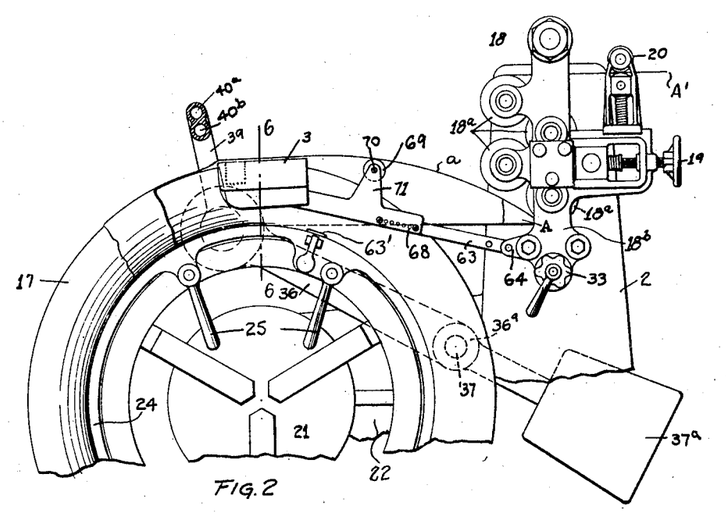
Fig. 2 is a fragmentary view, enlarged, with the material broken away to illustrate the guide device for the material.

The guide 3 is positioned in co-operative relationship to the bead engaging rollers 35, 35′, to insure uniform application of the web A to the core 17 without wrinkling of the body portion a thereof, by supporting and holding the body portion a out of contact with the core 17 (see Figs. 2 and 6) until or following the engagement of the beads with the bead rings 24 as they approach the rollers 35, 35′, to be rolled into position thereby. As shown in Figs. 1 and 2, the guide 3 extends over the core beyond the point of tangency at which the beads a′ engage the rings 24 for positioning in the pockets 17′, so as to maintain the body portion out of contact with the core 17 until the beads a′ engage the rings 24 and start to wind thereon as the core rotates.

The guide 3 may be of any desired form of construction, that illustrated being constructed as follows:

63 indicates a pair of spaced arms pivotally mounted at their inner ends upon lugs 64 supported by the standard 2 and plate 18ᵇ. The arms 63 preferably extend toward the core 17, each arm preferably comprising two strips adjustably connected at their adjacent ends in the manner to be later set forth. At their outer ends the arms 63 are connected by a transverse member 65, which preferably has a shape corresponding approximately to the cross-sectional shape of the member 17 on which the web A is to be wound. Where the rotatable member or core is curved transversely, the transverse member 65 is curved, preferably into U-shape. The purpose of the transverse member 65 is to connect the outer ends of the arms 63 together and also to support a guide element 66, over which the web A slides, in operative relation to the periphery of the core 17, as will be later set forth. 67 indicates a rod connected at its opposite ends to the inner ends of the arms 63 so as to maintain them in spaced relationship. The adjacent ends of the strips constituting each arm overlap each other so that they may be rigidly secured together in any desired manner, but preferably in a manner which permits of an adjustment of the strips endwise, whereby the outer strips may be moved relative to the inner strips. For this purpose, each strip is formed with a plurality of openings 68 which register with the openings of the other strip, thereby permitting one or more screws to be inserted through the openings and provided with nuts to clamp the plates together in face to face engagement.

69 indicates a roller rotatably mounted on the arms 63 and between the consolidating mechanism 18, or that roll 18ᵃ thereof from which the web A is delivered, and the curved member 65. The roll 69 is loosely mounted on a shaft 70 supported at its opposite ends in standards 71. The standards 71 may be integrally connected with the arms 63.

The guide element 66 projects outwardly beyond the curved member or section 65 and is adapted to extend over a portion of the core 17 so as to support the body portion $a$ of the web and guide it into contact with the core 17 in the manner already set forth.

Of the guide element 66, 72 indicates a shoe or plate over which the web A slides, formed with a plurality of openings 73 through which a fluid, such as air under pressure, is continuously discharged to provide a relatively thin air film between the plate and the web and thus prevent sticking of the material and to reduce or substantially eliminate all friction between them. 74 indicates a wall disposed below and spaced from the plate 72 to provide a fluid chamber 75 to supply the fluid to the openings 73. The plate 72 and wall 74 are curved transversely, the opposite side edges of the plate resting on and being secured to the wall by soldering or otherwise to hold them in spaced relation and to seal the chamber along its sides. The forward portion of the wall 74 preferably lies relatively close to the plate 72 and its front or free edge is inclined upwardly so that it may be secured thereto. By this arrangement, the free end of the guide plate 72 may be supported at a relatively short distance above the core 17 or the outer ply of material wound thereon, thereby permitting the web A to slide onto the core 17 or the material previously applied thereto substantially in a plane tangential to the point of contact. At its rear end, the plate 72 is bent downwardly, as shown at 76, to form the rear wall of the chamber 75, and secured in an air or liquid tight manner to the wall 74. The wall 74 is rigidly secured to the transverse member 65 in any desired manner, preferably by soldering or welding. 77 indicates a roller loosely mounted on the underside of the guide device 66 in position to ride on the core 17, as it rotates, and the material wound thereon, and serving to support the outer end of the guide device. By this arrangement it will be seen that the free or delivery end of the guide plate 72 has the same relation to the surface of the core 17 and each successive ply of material, so that no matter how many convolutions are wound on the core, the guide device operates uniformly to deliver the web A thereto, thereby preventing distortion and tending to secure uniformity of tension on the cords throughout all the plies of the material. The supporting roller 77 is preferably mounted in a recess formed by cutting away the transverse member 65. The shaft 78 for the roller 77 may be supported in openings formed in integral lugs depending from the side edges of the cut-away. To permit of this arrangement, the metal of the wall 74 is struck-up along the edges of the cut-away, as shown at 79 to form side walls for the chamber 75 around the cut-away.

The openings 73 may be arranged in any desired manner, but preferably extend over an area transversely of the plate 72 to either side of the longitudinal axis of the web A. I preferably provide three transverse rows of openings and connect their opposite ends by longitudinal rows.

80 indicates wings disposed at either side of the guide element 66 and depending therefrom. The purpose of the wings 80 is to guide the bead portions $a'$ and lateral sides of the web A to the core 17. The wings 80 are preferably provided by extending the opposite longitudinal sides of the wall 74 downwardly, which wall being formed of relatively thin gauged resilient metal provide flexible guide wings which are flexed inwardly by the web A as it conforms to the shape of the core in feeding thereto. Where greater flexibility is desired, the metal of the wall may be slitted along one or more longitudinal lines.

At one side, the walls of the chamber 75 have connected to them a tubular section 81, to which a pipe, preferably of flexible character, is connected, such pipe leading from a source of fluid supply to conduct the fluid (such as air under pressure) to the chamber 75 for delivery through the openings 73. A suitable valve may be provided to regulate the flow of the fluid to the chamber 75.

The air flowing through the openings 73 will contact with the lower face of the web A and thus form over the plate 72 (or a portion thereof) a film. This film will not only prevent all sticking of the web A to the plate, but on the other hand will serve as an anti-friction means so that the web will readily slide over and be guided by the plate, permitting it to be fed to the core 17 at any desired speed.

As the web A rides over the front edge of the plate 72 and is deflected downwardly on to the core 17, very little air is permitted to escape along the front edge of the plate; accordingly, the air backs up on the plate and forms a film over substantially its entire surface, so that but a relatively small number of discharge openings 73 near the forward or delivery end of the shoe is required.

The guide element 66 is supported in position to permit the feed of the bead portions $a'$ in a substantial tangential plane from the delivery feed roll 18$^a$ to that point on the bead rings 24 substantially opposite or slightly rearward of the bead rolling down devices, while supporting and guiding the body portion of the web A out of contact with the core 17 or the previously applied material until or following the rolling down of the bead portions $a'$, thereby insuring the uniform laying of the web on the core at all points transversely without danger of wrinkling or distortion.

From the foregoing description it will be seen that I provide a shoe adapted to so deliver the body portion of the material to the winding member that winding thereon may be effected with uniformity and smoothness and at any desired speed. In winding a carcass from material of the character herein referred to, the beads are wound helically in side by side relation and must be progressively rolled in position at opposite sides of the core prior to or at the same time that the body portion of the material is applied thereto. In the operation of my shoe I am enabled to guide and support the body portion of the material out of contact with the core until or following the engagement of the bead rolling down devices with the beads to press them against the sides of the core adjacent the bead rings.

To insure simplicity of construction and adaptability of the bead rolling and positioning mechanism to cores of different diameters, I have developed a method of locating the shaft 37 for the arm 36, so that the latter will position the rollers 35, 35', in their operative relation to cores of different diameters, without the adjustment of any parts or substitution of new parts. In this method, I proceed as follows: first, I draw a plurality of circles corresponding to the diameters of the bead rings for the several sizes of cores to be used, (three such circles struck on the radii $x$, $x^1$, $x^2$, being shown in Fig. 10), and a circle representing the feed roll $18^{ax}$ from which the web A is delivered, the axes for the circles $x$, $x^1$, $x^2$ and circle $18^{ax}$ having the same relation as the corresponding axes for the chuck shaft and feed roll; next, I project lines $A^2$, $A^3$, $A^4$, from the circle $18^{ax}$ to the peripheries of the circles $x$, $x^1$, $x^2$, respectively; next, I develop from the circle $18^{ax}$ an involute curve $z$, intersecting the points of tangency of the lines $A^2$, $A^3$, $A^4$, to the circles $x$, $x^1$, $x^2$, respectively; next, I find the approximate center of the involute curve $z$, which center becomes the axis of the shaft 37; finally, I take the radius of the curve $z$ from the axis of the shaft 37 and increase such radius an amount equal to the distance from the point $y$ to the point $x$ (see radius $z'$), which gives the operative position of the rollers 35, 35'. As a curve $z^2$ struck by the radius $z'$ is substantially concentric to the curve $z$, it will be seen that in the use of cores of different diameters, the rollers 35, 35', will be positioned at approximately the same distance from the respective points of contact (indicated at $y$, $y'$, $y^2$,) of the bead portions $a'$ with the bead rings.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

No claim is made herein to the guide device illustrated and described since it forms the subject-matter of a separate, co-pending application (see Patent No. 1624272).

What I claim is:

1. In apparatus of the class described, the combination with a support, of a core rotatably mounted thereon, bead rings on the opposite sides of said core, means for feeding material to said core with its side edges in tangential relation to said rings, and a pair of devices operated toward the sides of said core and positioned to engage the side edges of the material at a point having a predetermined spaced relation to the point of engagement of the material with said rings.

2. In apparatus of the class described, the combination with a support, of a core rotatably mounted thereon, bead rings on the opposite sides of said core, means for feeding material to said core with its side edges in tangential relation to said rings, and a pair of devices yieldingly operated toward the sides of said core and positioned to engage the side edges of the material at a point having a predetermined spaced relation to the point of engagement of the material with said rings.

3. In apparatus of the class described, the combination with a support, of a core rotatably mounted thereon, said core having bead rings co-operating with the sides of said core to form bead receiving pockets, means for supplying material with its side edges in tangential relation to said bead rings for winding on said core, a pair of devices mounted to move toward said core at substantially right angles to the plane thereof and in a plane tangential to the active faces of said rings, means for yieldingly pressing said devices against the side edges of the material to position the latter in the receiving pockets, and means for retracting said devices.

4. In apparatus of the class described, the combination with a support, of a core rotatably mounted thereon, bead rings on the opposite sides of said core, means for feeding material to said core with its side edges in tangential relation to the peripheries of said rings, a pair of rollers disposed in a plane tangential to the peripheries of said rings and arranged to engage therewith beyond the point of engagement of the side edges of the material with said rings, means for supporting said rollers to move at right angles to the plane of the core, and means for yieldingly operating said rollers.

5. In apparatus of the class described, the combination with a support, of a core rotatably mounted thereon, said core having bead rings co-operating with the sides thereof to form bead receiving pockets, means for supplying material with its side edges in tangential relation to said bead rings for winding on said core, a pair of devices mounted to move toward said core at substantially right angles to the plane thereof and in a plane tangential to the active faces of said rings, and means for yieldingly pressing said devices against the side edges of the material to position the latter in the bead receiving pockets.

6. In apparatus of the class described, the combination with a support, of a core rotatably mounted thereon, and having bead rings, means for feeding material to said core with its side edges in tangential relation to said bead rings, a pair of aligned devices yieldingly operated toward the sides of said core and positioned to engage the side edges of the material at a point beyond their points of engagement thereof with said rings, and means for preventing dis-alignment of said devices during movement.

7. In apparatus of the class described, the combination with a support, of a core rotatably mounted thereon, said core having bead rings co-operating with the sides of said core to form bead receiving pockets, means for supplying material with its side edges in tangential relation to said bead rings for winding on said core, a pair of aligned devices mounted to move toward said core at substantially right angles to the plane thereof and in a plane tangential to the active faces of said rings, means for yieldingly pressing said devices against the side edges of the material to position the latter in the bead receiving pockets in side by side relation, and means for preventing dis-alignment of said devices during movement.

8. In apparatus of the class described, the combination with a support, of a core rotatably mounted thereon, means for supplying material to said core for winding thereon, a frame supporting at its opposite ends a pair of cylinders having their axes in alignment and extending at substantially right angles to the plane of said core, pistons in said cylinders, rollers mounted on said pistons and projected thereby into engagement with the opposite sides of said core, means for supplying fluid to said cylinders for operating the pistons towards said core, and valve means for controlling the flow of the fluid to said cylinders.

9. In apparatus of the class described, the combination with a support, of a core rotatably mounted thereon, means for supplying material to said core for winding thereon, a frame supporting at its opposite ends a pair of cylinders having their axes in alignment and extending at substantially right angles to the plane of said core, pistons in said cylinders, rollers mounted on said pistons and projected thereby into engagement with the opposite sides of said core, means for supplying fluid to said cylinders for operating the pistons towards said core, valve means for controlling the flow of the fluid to said cylinders, and guide means between the walls of said cylinders and pistons for preventing dis-alignment of said devices during movement.

10. In apparatus of the class described, the combination with a support, of a rotatable core removably mounted on said support, bead rings on the opposite side of said core, means for feeding a strip of tire material to said core with its side edges in tangential relation to the peripheries of said rings, a pair of aligned rollers operable toward the sides of said core, and means for supporting said rollers to engage the side edges of the strip at a predetermined distance beyond the tangential point of engagement of the side edges of the strip with said rings irrespective of the size of core.

11. An apparatus as claimed in claim 10 in which said supporting means includes a swingable arm the pivot for which constitutes the approximate center of an arc cutting the points of tangency of the side edges of the material with said rings of the different sizes of cores to be used.

12. An apparatus as claimed in claim 10 in which said supporting means comprises an arm movably mounted on said support and a frame supporting said rollers at opposite sides of said core, said frame being adjustable on said arm on an axis transverse to said core.

13. In apparatus of the class described, the combination with a support, of a rotatable core mounted on said support, means for feeding a strip of tire material to said core with its side edges in tangential relation to the inner portion thereof, a pair of rollers operable toward the sides of said core, and means for supporting said rollers to engage the side edges of the strip beyond the tangential point of engagement of the side edges of the strip with the core, said supporting means comprising an arm movably mounted on said support, a transverse frame and cylinders having pistons carrying said rollers.

14. In apparatus of the class described, the combination with a support, of a rotatable core mounted on said support, means for feeding a strip of tire material to said core with its side edges in tangential relation to the inner portion thereof, a pair of rollers operable toward the sides of said core, and means for supporting said rollers to engage the side edges of the strip beyond the tangential point of engagement of the side edges of the strip with the core, said supporting means comprising an arm movably mounted on said support and a transverse frame and cylinders having pistons non-rotatably mounted therein and carrying said rollers.

15. An apparatus as claimed in claim 10 in which said supporting means comprises an arm movably mounted on said support and a frame for supporting said rollers in aligned relation at opposite sides of said core, said frame being adjustable on said arm on an axis transverse to said core.

16. In apparatus of the class described, the combination with a support, of a core rotatably mounted thereon, bead rings at opposite sides of said core, means for feeding material to said core with its side edges in tangential relation to the said bead rings, a pair of devices operable toward the sides of said core and positioned to engage the side edges of the material at a point beyond their engagement with said rings to roll them into side by side relation on said rings, and means for supporting the intermediate portion of the material until or following the engagement of said devices with the side edges thereof.

17. In apparatus of the class described, the combination with a support, of a core rotatably mounted thereon, bead rings upon the opposite sides of said core, means for feeding material to said core with its side edges in tangential relation to said rings, a pair of relatively movable devices positioned at the opposite sides of said core at a point beyond the points of engagement of the side edges of the material with said rings and operable to roll the side edges into side by side relation on the latter, and means for supporting the intermediate portion of the material until or following the engagement of said devices with the side edges thereof.

18. An apparatus as claimed in claim 17 in which said relatively movable devices comprise rollers.

19. An apparatus as claimed in claim 17 in which means are provided for adjusting said devices relative to a plane that is tangential to said bead rings.

20. In apparatus of the class described, the combination with a support, of a core rotatably mounted thereon and provided with bead rings, means for feeding material to said core with its side edges in tangential relation to said rings, a pair of devices operable toward the sides of said core and positioned to engage the side edges of the material to roll them into side by side relation upon said rings, means for supporting the intermediate portion of the material until or following the engagement of said devices with the side edges thereof, and means for adjusting said supporting means relative to said rolling devices.

21. In apparatus of the class described, the combination with a support, of a core rotatably mounted thereon and provided with bead rings, means for supplying material to said core with its side edges in substantially tangential relation to said rings, a pair of devices operable toward the sides of said core and positioned to engage the side edges of the material to roll them into side by side relation upon said rings, and means for supporting the intermediate portion of the material until or following the engagement of said devices with the side edges thereof, said supporting means having engagement with said core and the material wound thereon to maintain its guiding end in fixed relation to the core or the last convolution of the material as winding proceeds.

22. In apparatus of the class described, the combination with a support, of a core rotatably mounted thereon and provided with bead rings, means for supplying material to said core with its side edges in substantially tangential relation to said rings, a pair of devices operable toward the sides of said core and positioned to engage the side edges of the material to roll them into engagement with said core, means for supporting the intermediate portion of the material until or following the engagement of said devices with the side edges thereof, and anti-friction means on the under side of said supporting means arranged to ride on the core or the material as it winds thereon to maintain its guiding end in fixed relation to the core or the last convolution of the material as winding proceeds.

23. In apparatus of the class described, the combination with a support, of a core rotatably mounted thereon and provided with bead rings, means for supplying material to said core with its side edges in substantially tangential relation to said rings, a pair of devices operable toward the sides of said core and positioned to engage the side edges of the material to roll them into side by side relation upon the bead ring at each side of said core, means for supporting the intermediate portion of the material until or following the engagement of said devices with the side edges thereof, said supporting means including a guide element having a transverse contour corresponding to the shape of the outer portion of said core.

24. In apparatus of the class described, the combination with a support, of a core rotatably mounted thereon, said core having bead rings co-operating with the sides thereof to form bead receiving pockets, means for supplying material with its side edges in tangential relation to said bead rings for winding on said core, a pair of devices mounted to move toward said core in a direction at substantially right angles to the plane thereof, means for pressing said devices against the side edges of the material to position the latter in side by side relation upon said bead rings, and means for supporting the body portion of the material as it feeds to said core until or following the engagement of said devices with the side edges of the material.

In testimony whereof, I have hereunto subscribed my name.

HOWARD I. MORRIS.